(12) United States Patent
Scott

(10) Patent No.: US 11,017,536 B2
(45) Date of Patent: May 25, 2021

(54) IMAGE SEGMENTATION

(71) Applicant: Mako Surgical Corp., Fort Lauderdale, FL (US)

(72) Inventor: Ian Michael Scott, Stockport (GB)

(73) Assignee: Mako Surgical Corp., Fort Lauderdale, FL (US)

( * ) Notice: Subject to any disclaimer, the term of this patent is extended or adjusted under 35 U.S.C. 154(b) by 70 days.

(21) Appl. No.: 16/391,381

(22) Filed: Apr. 23, 2019

(65) Prior Publication Data

US 2019/0340765 A1 Nov. 7, 2019

Related U.S. Application Data

(60) Provisional application No. 62/665,656, filed on May 2, 2018.

(51) Int. Cl.
*G06T 7/00* (2017.01)
*G06T 7/11* (2017.01)
*G06T 7/174* (2017.01)

(52) U.S. Cl.
CPC ............... *G06T 7/11* (2017.01); *G06T 7/174* (2017.01)

(58) Field of Classification Search
CPC .................................. G06T 7/11; G06T 7/174
See application file for complete search history.

(56) References Cited

U.S. PATENT DOCUMENTS

| | | | |
|---|---|---|---|
| 6,973,212 B2 | 12/2005 | Boykov et al. | |
| 8,379,957 B2 | 2/2013 | Slabaugh et al. | |
| 2007/0292025 A1 | 12/2007 | Boykov et al. | |
| 2008/0030497 A1 | 2/2008 | Hu et al. | |
| 2015/0253880 A1* | 9/2015 | Luo ........................ | G06K 9/46 345/179 |
| 2017/0206662 A1* | 7/2017 | Wang ...................... | G06T 7/143 |
| 2018/0012365 A1* | 1/2018 | Chefd'hotel ............ | G06T 7/187 |
| 2019/0304098 A1* | 10/2019 | Chen ..................... | G06K 9/4628 |

FOREIGN PATENT DOCUMENTS

WO 2011098752 A2 8/2011

OTHER PUBLICATIONS

International Search Report for Application No. PCT/GB2019/051222, dated Jul. 12, 2019, pp. 1-4.

* cited by examiner

*Primary Examiner* — Ping Y Hsieh
(74) *Attorney, Agent, or Firm* — Lerner, David, Littenberg, Krumholz & Mentlik, LLP

(57) ABSTRACT

A method for segmenting an image includes receiving one or more object seeds associated with one or more first object portions represented by a first image and receiving one or more background seeds associated with one or more first background portions represented by the first image. A second image representing one or more second object portions and one or more second background portions is received, wherein the first image comprises a plurality of subportions and the second image is a subportion of the plurality of subportions of the first image. The second image is processed based on the one or more object seeds and the one or more background seeds to determine the one or more second object portions and the one or more second background portions.

15 Claims, 5 Drawing Sheets

700

700

IMAGE SEGMENTATION

CROSS-REFERENCE TO RELATED APPLICATIONS

This application claims the benefit of the filing date of U.S. Provisional Patent Application No. 62/665,656 filed May 2, 2018, the disclosure of which is hereby incorporated herein by reference.

BACKGROUND

Segmentation is an important processing step in many imaging applications for analyzing or interpreting an image. In particular, image segmentation is the process of assigning a label to every pixel in an image such that pixels that share similar characteristics such as color, intensity or texture are given the same label. In medical imaging, segmentation methods are used to identify boundaries of specific objects such as bones, heart, tumors or any such anatomical structures or abnormal regions in a medical image. The medical images may be obtained by means of Magnetic Resonance Imaging (MRI), Computed Tomography (CT), Ultra Sound (US) or any other imaging modalities. Identification of specific objects in a medical image helps in extracting meaningful quantitative information from the medical image that will aid in the diagnosis of a subject's medical condition. Segmentation of medical images is also useful for many other applications, including surgical planning, robotic surgery, patient-specific instrumentation (PSI), and drug trials.

Various computer-aided segmentation methods have been developed for segmenting medical images. These methods can generally be classified as automatic (unsupervised), interactive (semi-supervised), and manual (supervised) methods. Manual segmentation methods give reliable results when identifying objects from an image for a particular clinical task, such as tumor detection. In manual segmentation methods, a user or an operator, who is generally a medical practitioner with a knowledge of the human anatomy, utilizes mouse-based software to outline or label regions of specific objects in an image that can be further utilized for providing a specific diagnosis. Such a method of manually identifying specific objects does not serve the needs of daily clinical use well as it is tedious, time consuming and suffers from problems related to operator variability.

Unsupervised or automatic segmentation methods such as ones based on thresholding, watershed, edge detection, morphological operation, neural network, region growing, graph cuts or shape analysis provide segmentation results without prior-knowledge about the images and without any user interaction. Unsupervised segmentation methods are generally applied for segmentation of well-circumscribed objects in an image. When applied to medical images, they are able to generate rough segmentation results which would require further refinement.

The shortcomings of automatic and manual segmentation methods led to the development of interactive or semi-automatic segmentation methods. Interactive segmentation methods use a combination of human experts and machine intelligence to improve segmentation accuracy and efficiency. In interactive segmentation methods, an image is initially processed using an auto segmentation method to obtain a segmentation estimate. A segmentation estimate is an image in which the boundaries of specific objects in the image have been determined. Any errors in the segmentation estimate will be identified by a user and corrected.

Error correction is then performed by discarding the segmentation estimate and generating a new segmentation estimate. The user is required to provide additional input and the image is reprocessed using the automatic segmentation algorithm based on user provided input until an optimum segmentation estimate is obtained. For example, the user input may be the labelling of one or more pixels in the image as foreground or background. Labelling pixels in the image will provide the auto segmentation algorithm with further information about the characteristics or location of the pixels that are required to be grouped together or labelled the same. Examples of such interactive segmentation methods are disclosed in U.S. Pat. Nos. 6,973,212 and 8,379,957, the disclosure of which are hereby incorporated by reference herein. Such error correction methods require large amount of processing power and increased user involvement.

The present application discloses a segmentation method that overcomes these limitations by providing an improved method for correcting errors in a segmented image or a segmentation estimate.

BRIEF SUMMARY

According to a first aspect, there is provided a method for segmenting an image, the method comprising: receiving one or more object seeds associated with one or more first object portions represented by a first image; receiving one or more background seeds associated with one or more first background portions represented by the first image; receiving a second image representing one or more second object portions and one or more second background portions, wherein the first image comprises a plurality of subportions and the second image is a subportion of the plurality of subportions of the first image; and processing the second image based on the one or more object seeds and the one or more background seeds to determine the one or more second object portions and the one or more second background portions.

By processing a subportion of a first image using object seeds and background seeds associated with the first image, an accurate determination of the object portions and background portions represented by the subportion can be efficiently generated.

The first image may comprise a plurality of image regions. Each of the image regions of the first image may be identified as an object seed or a background seed. The first image may, for example, be a segmented image. For example, the first image may comprise a plurality of pixels and each pixel in the image may be labelled as an object or a background depending on certain visual characteristics of the pixels. A pixel labelled as an object may be identified as an object seed and a pixel labelled as a background may be identified as a background seed. It will be appreciated that the first image and subportions may be two-dimensional images or may be three-dimensional images such that the image regions may be voxels. It will be appreciated that the first image may also be a four-dimensional spatio-temporal image such that the image regions may be voxels comprising a temporal dimension.

Each of the image regions of the first image may be identified as an object seed or a background seed by processing the first image using a first segmentation algorithm. The first segmentation algorithm may be any suitable segmentation algorithm, however in a preferred aspect, processing the first image using a first segmentation algorithm may comprise fitting a model to the first image. The model may, for example, represent variation within a set of images of a structure represented in the first image and may be fitted to the first image based upon properties of the image. The fitting may comprise applying a fitting technique selected from the group consisting of: rigid registration, non-rigid registration, active shape modelling and active appearance modelling. Indeed, the fitting may comprise applying any suitable fitting technique.

The first segmentation algorithm may provide a segmentation of the first image that provides an estimated segmentation, using relatively low computing resources or by off-line computing methods that process the first image in background servers before providing the estimated segmentation to the user. It will be appreciated that offline computing may be used to increase the speed of the segmentation process by reducing the amount of time the user has to wait for an estimated segmentation. The estimated segmentation may include one or more errors. That is, the estimated segmentation may include one or more image portions that are erroneously indicated as background or foreground. In prior art techniques, typically where a segmented image is identified as including errors, the entire image is reprocessed. According to the first aspect, only a subportion that is identified as including one or more errors is processed using information of the first image that is not identified as including one or more errors.

The second image may comprise a plurality of image regions. The plurality of image regions of the second image may correspond to image regions of the plurality of image regions in the first image. For example, the second image may comprise a subset of pixels of the plurality of pixels in the first image.

Each seed of the one or more object seeds and the one or more background seeds may be associated with a respective image region. Processing the second image may comprise associating image regions of the plurality of image regions with the one or more second object portions and the one or more second background portions based on the one or more object seeds and the one or more background seeds of the first image.

Processing the second image may comprise processing the second image using a second segmentation algorithm. The one or more object seeds and the one or more background seeds may therefore be provided as input to the second segmentation algorithm. The second segmentation algorithm may be an algorithm based upon a graph cuts algorithm. The graph cuts algorithm may take as input one or more object seeds and one or more background seeds of the received one or more object seeds and one or more background seeds. The second segmentation algorithm may be different to the first segmentation algorithm used to segment the first image. The one or more object seeds or the one or more background seeds that are used in processing the second image may be associated with at least one object portion or at least one background portion represented by the second image.

As described above, the first image may comprise an estimated segmentation that may include one or more image portions that are erroneously indicated as background or foreground. By processing a subportion that is identified as including an erroneously labelled image portion based upon image portions that are not identified as including an erroneously labelled image portion, the processing of the subportion can use information from the estimated segmentation to correct erroneously labelled image portions.

Processing the second image based on the one or more object seeds and the one or more background seeds may comprise processing the second image based upon one or more object seeds and one or more background seeds associated with the peripheral edge of the second image. Seeds associated with the peripheral edge of the second image may comprise image regions on, around or at the peripheral edge of the second image. Each image region of the peripheral edge of the second image may be used either as an object seed or a background seed for processing the second image. All the image regions in the second image except any image regions associated with the one or more object seeds or one or more background seeds used for processing the second image may be treated as unlabeled image portions such that processing of the second image comprises relabeling the image regions as either object or background based on the one or more object seeds and the one or more background seeds. By using image portions at or around the peripheral edge of the second image, typically the subportion can be segmented with high accuracy using relatively low computing resources.

At least one of the received object seeds may be associated with a first background portion represented by the first image. At least one of the received background seeds may be associated with a first object portion represented by the first image. For example, the first image may comprise one or more image regions that are identified as associated with the one or more object portions in the first image which represent one or more background portions or conversely in which the image regions are identified as background which represent object in the first image. If the first image is an image that has been initially processed using a segmentation algorithm, the at least one pixel that is either incorrectly identified as object or as background in the initial segmentation constitutes an error.

The second image may be a subportion of the first image associated with the first background portion with which the at least one of the received object seeds is associated. Alternatively, the second image may be a subportion of the first image associated with the first object portion with which the at least one of the received background seeds is associated. That is, the second image may comprise image regions of the plurality of image regions in the first image that are either incorrectly identified as object or as background.

The second image may be a subportion of the first image selected by a user. For example, the first image may be displayed to a user and the second image may be selected based upon the displayed image. A graphical representation of the first image may be displayed to the user and the user may select, using a user interface, image regions in the first image as including one or more errors and the portions selected by the user may be processed using a segmentation algorithm based upon image portions that are not selected by the user, as described above.

The first image may be an image representing an anatomical region of interest of a subject such as a joint or tissue region. The one or more first object portions may represent any anatomical structure including healthy tissue such as bones and organs, or anomalies such as tumors and cysts associated with the region of interest. The one or more second background portions may represent portions that do not form part of the one or more first object portions represented by the first image. The first image may, for example, be a projection image generated by projecting electromagnetic radiation through an object from a first source of electromagnetic radiation to a first sensor of electromagnetic radiation.

Each subportion may comprise a plurality of contiguous pixels in the first image representing an object portion or a background portion or a combination thereof.

The method allows the image regions comprised in a second image to be processed independently of the image regions in the first image. Once the image regions in the second image have been processed, the processed image regions may be used to update the first image. The method allows processing of a specific area of the image such that a more precisely segmented region of interest can be obtained. The segmentation can be performed based on the information associated with the image regions in the image itself either provided by the user or automatically generated. By this method the accuracy of the resulting segmented image can be improved while at the same time minimizing time and interaction required from a user.

Aspects of the invention can be combined and it will be readily appreciated that features described in the context of one aspect of the invention can be combined with other aspects of the invention.

It will be appreciated that aspects of the invention can be implemented in any convenient form. For example, the invention may be implemented by appropriate computer programs which may be carried on appropriate carrier media which may be tangible carrier media (e.g. disks) or intangible carrier media (e.g. communications signals). Aspects of the invention may also be implemented using suitable apparatus which may take the form of programmable computers running computer programs arranged to implement the invention.

BRIEF DESCRIPTION OF THE DRAWINGS

Aspects will now be described, by way of example, with reference to the figures in which.

DETAILED DESCRIPTION

Figure 1:
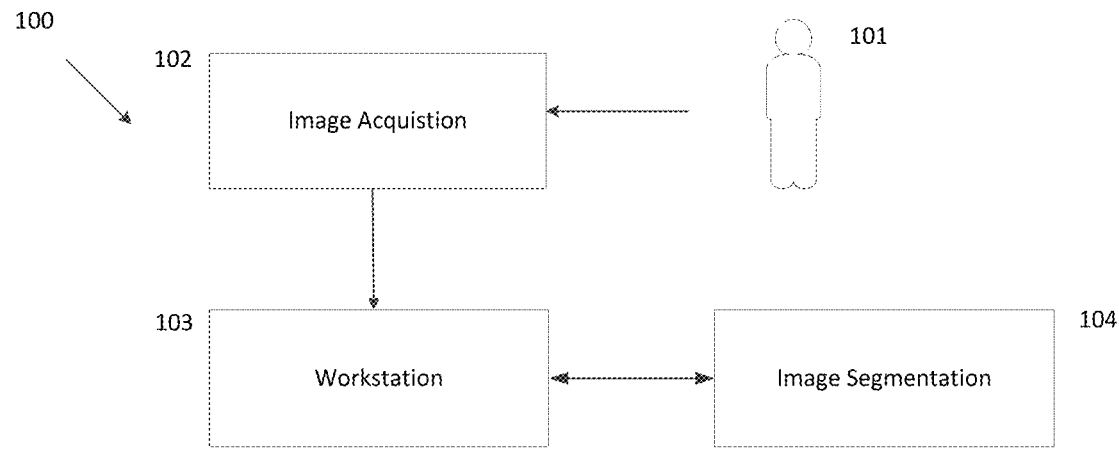
FIG. 1 is a schematic illustration of the components of a medical image acquisition and processing system.

Referring to FIG. 1, a system 100 for acquiring and processing an image of a subject 101 is shown. The system 100 comprises an image acquisition module 102 for obtaining image data from the subject 101. The image data represents a region of interest of the subject and comprises one or more object portions and one or more background portions. The one or more object portions may correspond to any anatomical structure including healthy tissue such as bones and organs, or anomalies such as tumors and cysts. The one or more background portions are portions that do not form part of the one or more object portions of the image data.

The image data is acquired by the acquisition module using an imaging technique performed on the subject. The imaging technique may be any suitable imaging technique such as, for example, X-ray radiography, Computed Tomography (CT), Magnetic Resonance Imaging (MRI) or Ultrasound (US). It will be appreciated that other known imaging techniques can also be used to obtain the image data.

A workstation 103 is arranged to display image data obtained by the image acquisition module 102 to a user and to receive user input associated with the image data. An image segmentation module 104 is arranged to process the image data to generate a segmentation of the image that identifies the one or more object portions and the one or more background portions.

The segmented image may be used to identify boundaries of specific objects such as bones, heart, tumors or any such anatomical structures or abnormal regions in the image. The identified objects may be used to extract quantitative information from the image that may be used in the diagnosis of a subject's medical condition, surgical planning, robotic surgery, patient-specific instrumentation (PSI), and drug trials. It will be appreciated that the accuracy of the boundaries of the one or more object portions identified in the segmentation affects the usefulness of the image segmentation. For example, an error in the segmentation can lead to an inaccurate diagnosis regarding a medical condition of a subject.

In order to provide an accurate segmentation quickly and efficiently, an initial segmentation of image data may be displayed to a user. The segmentation may, for example, be an initial segmentation generated using a segmentation technique that provides an estimated segmentation of the region of interest without any input from a user. The initial segmentation may therefore be an automatically generated segmentation of the image data.

The initial segmentation may be displayed to a user and the user may provide input indicating one or more portions of the image data in which the user identifies that the initial segmentation is incorrect. For example, the user may identify an image region that is a subportion of the image data that provides the initial segmentation in which the initial segmentation identifies one or more pixels as object but that the user identifies as background, or conversely in which pixels are identified as background in the segmentation that the user identifies as object.

The user input takes the form of an indication of a subportion of the initial segmentation in which the user identifies an error. The indicated subportion is processed using a segmentation technique using data from the initial segmentation in the segmentation technique. In particular, the processing of the subportion uses information indicating object portions and background portions in the initial segmentation as input to the segmentation technique. In particular, information associated with pixels (or any other image element such as a voxel) at a peripheral edge of the subportion may be used as input to the segmentation technique, with all other pixels of the subportion being treated as unknown in the segmentation technique. The information associated with pixels may be a label indicating whether the pixel is identified as object or background in the initial segmentation. The pixels of the subportion are processed independently of other pixels in the image data to generate a new segmentation of the subportion and corresponding pixels of the initial segmentation may be updated based upon the new segmentation.

In existing segmentation techniques, if a user identifies an error in a segmentation estimate, error correction is typically performed by reprocessing the image data to generate a new segmentation estimate. The user may input additional information such as selecting additional pixels as background or object and the image data is then reprocessed based on the user inputs to obtain a new segmentation estimate and the user is able to regenerate image segmentations until a satisfactory segmentation is generated. By processing subportions that are identified as including an error and using information of the initial segmentation, a new segmentation can be quickly and effectively generated to correct segmentation errors in the initial segmentation.

Figure 2:
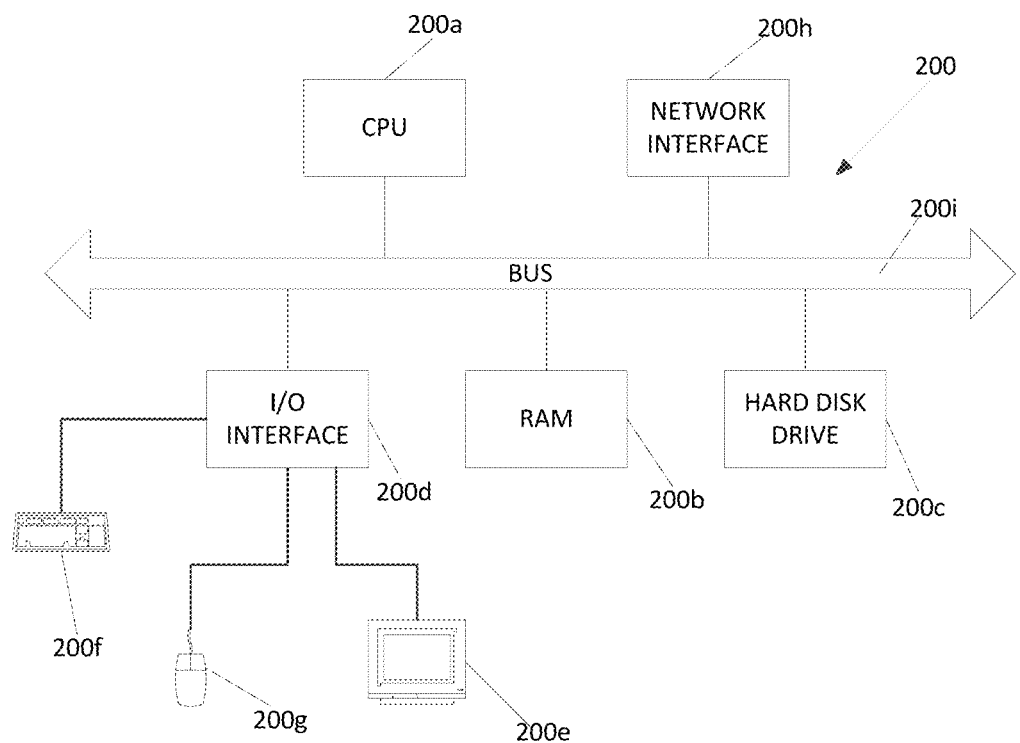
FIG. 2 is a schematic illustration of a computer suitable for carrying out processing of the processing system of FIG. 1.

FIG. 2 shows a computer 200 suitable for viewing and performing image segmentation on the image in further detail. It can be seen that the computer comprises a CPU 200a which is configured to read and execute instructions stored in a volatile memory 200b which takes the form of a random access memory. The volatile memory 200b stores instructions for execution by the CPU 200a and data used by those instructions.

The computer 200 further comprises non-volatile storage in the form of a hard disc drive or a solid state drive 200c. The computer 200 further comprises an I/O interface 200d to which is connected peripheral devices used in connection with the computer 200. More particularly, a display 200e is configured so as to display the image or any output from the computer 200. Input devices are also connected to the I/O interface 200d. Such input devices include a keyboard 200f and a mouse 200g which allow user interaction with the computer 200. The input devices (200f, 200g) allow a user or an operator to interact with the system 100, for example to select areas of the image that include an error. A network interface 200h allows the computer 200 to be connected to an appropriate computer network so as to receive and transmit data from and to other computing devices. The CPU 200a, volatile memory 200b, hard disc drive 200c, I/O interface 200d, and network interface 200h, are connected together by a bus 200i.

There will now be described with reference to FIGS. 3 to 7, methods for generating a segmentation estimate of image data representing one or more objects. In general terms, the segmentation estimate comprises a plurality of labelled image regions, for example pixels, in which each image region is labelled as representing object or background.

Figure 3:
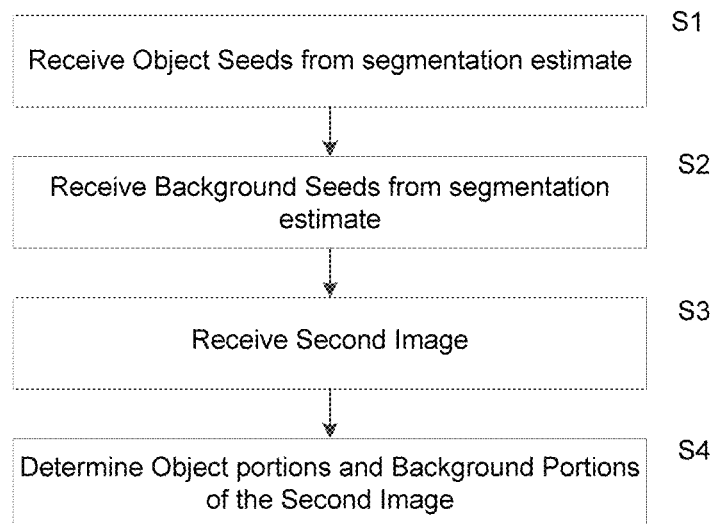
FIG. 3 is a flowchart showing processing for performing error correction in a subportion of a segmentation estimate.

Turning first to FIG. 3, at step S1 one or more object seeds are received and at step S2 one or more background seeds are received. The object seeds and background seeds are associated with a segmentation estimate of image data representing one or more objects. Each object seed indicates a pixel (or any other image region) that is identified as representing an object in the segmentation estimate and each background seed is correspondingly a pixel that is identified as representing background (i.e. not representing an object of the one or more objects). The image data may be, for example, image data representing an anatomical structure of a subject imaged using an imaging technique such as CT, X-ray radiography, MRI or the like and the regions may be pixels, voxels or any other region associated with image data representing an object.

At step S3 an image subportion is received. The image subportion is a subset of the image data and comprises a plurality of pixels of the image data. The image subportion represents at least one object portion of the one or more objects represented in the image data and includes a segmentation error in which the segmentation estimate for the at least one object portion is determined to be incorrect. That is, the segmentation error comprises at least one pixel that is either incorrectly identified as object or as background in the initial segmentation.

In general terms, the image subportion is generated from user input received based upon a graphical representation of the segmentation estimate. For example, a graphical representation of the segmentation estimate may be displayed to the user and the user may select a region of the segmentation estimate that the user identifies as comprising at least one error.

At step S4, the image subportion is processed based on the one or more object seeds and one or more background seeds received at steps S1 and S2 to generate an updated segmentation estimate for the image subportion, which may subsequently be used to update the initial segmentation to provide an updated image segmentation with the segmentation error of the image subportion corrected.

As indicated above, the image subportion received at step S3 represents at least one object portion of the one or more objects represented in the image data. The one or more object seeds that are used in the processing of the image portion at step S4 are associated with the at least one object portion represented in the image subportion. Correspondingly, the one or more background seeds that are used in the processing of the image subportion at step S4 are associated with at least one background portion represented in the image subportion. The one or more object seeds and one or more background seeds indicate regions of the segmentation estimate that are considered to be correctly labelled and are typically pixels on or around the peripheral edge of the image portion received at step S3. In some embodiments further seeds may be provided, for example by receiving input from the user indicating one or more object and/or background seeds associated with the image subportion, for example within the image subportion.

In one embodiment, each pixel of the peripheral edge of the image subportion is used as either an object or background seed in the processing of step S4. All other pixels of the image portion are labelled as unknown and the processing classifies each of the pixels labelled as unknown as either object or background, with each of the object seeds and background seeds unchanged. The one or more object seeds and one or more background seeds provide input for a segmentation algorithm that is used to process the image subportion independently of other subportions of the image data. It will be appreciated that processing the image subportion includes processing a portion of the image data that includes the subportion as well as any of the seeds used in the processing of step S4 and the portion of the image data that is processed at step S4 may in some embodiments be an image subportion that is larger than the image subportion received at step S3.

The processing of FIG. 3 therefore allows an initial segmentation estimate to be improved based upon user identification of errors in the initial segmentation without requiring a segmentation algorithm to be performed on the entire image data. By using information from an initial segmentation that is local to the user identified error, the segmentation algorithm may be provided with information that allows the segmentation algorithm to generate an accurate updated segmentation without errors quickly and efficiently.

Figure 4:
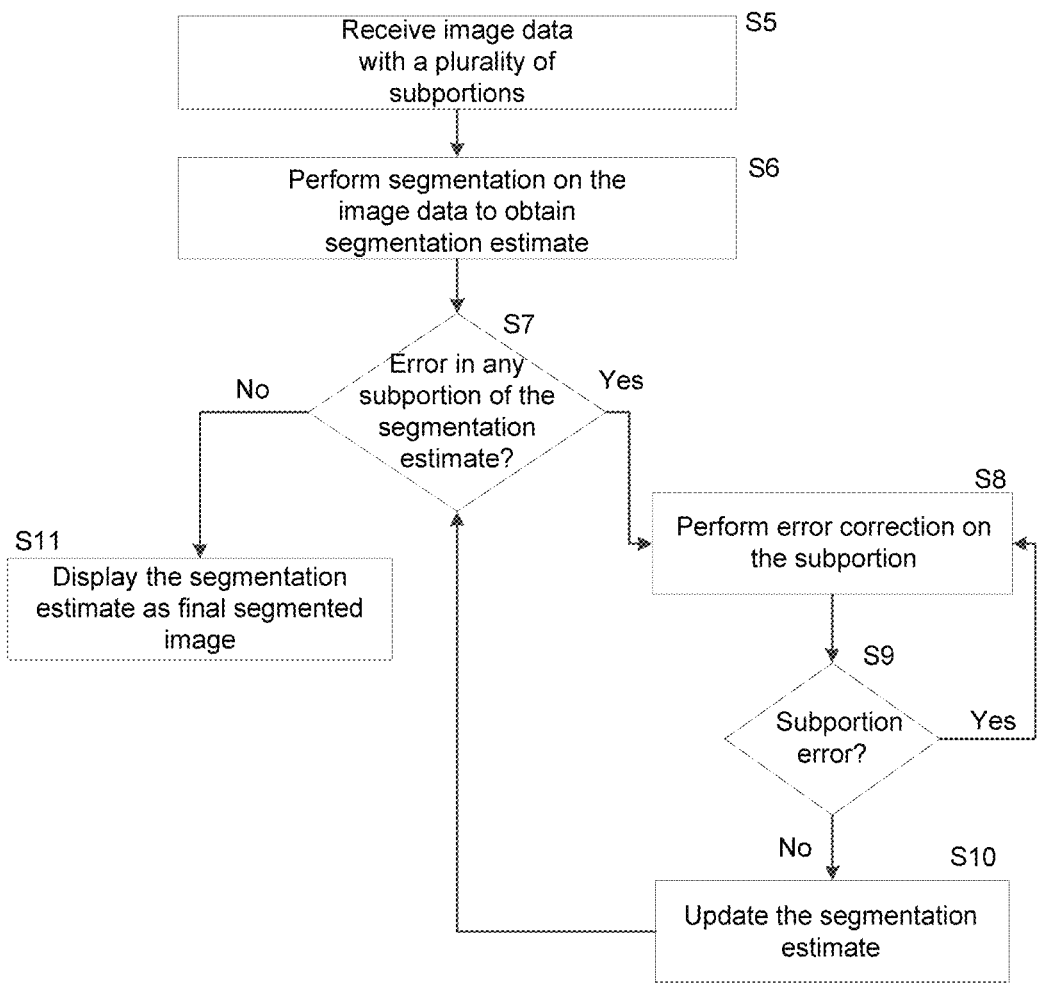
FIG. 4 is a flowchart showing processing for segmenting an image.

FIG. 4 is an overview of processing performed by image segmentation module 104 to generate a segmentation of image data.

At step S5 an image obtained by performing an image acquisition technique on a subject is received and at step S6, the image obtained at step S5 is processed to generate an initial segmentation estimate. The initial segmentation estimate may be obtained in any convenient way, for example using a model fitting technique such as that described in International Patent Publication Number WO2011/098752, which is herein incorporated by reference.

At step S7 it is determined whether any errors are present in the initial segmentation estimate. Determination of whether any errors are present in the initial segmentation estimate may be based upon user input indicating a subportion of the segmentation estimate that includes an error. For example, the user may provide input indicating a subportion of the initial segmentation estimate that includes an error using an interface. The user indication may be provided in any convenient way, for example by way of user interaction with a representation of the initial segmentation estimate on a screen, for example using a touch screen, a mouse input or any other suitable input.

If it is determined at step S7 that there is an error the processing passes to step S8. At step S8, the subportion of the initial segmentation estimate comprising the error is processed using a method as described with reference to FIG. 3. In particular, a segmentation algorithm is performed on the subportion based upon object and background seeds that are determined from the initial segmentation estimate. The segmentation algorithm may be based upon a graph cuts algorithm such as that described in U.S. Pat. No. 6,973,212. The graph cuts algorithm takes as input the subportion of the initial segmentation and one or more object seeds and one or more background seeds indicate regions of the segmentation estimate that are considered to be correctly labelled, typically pixels on or around the peripheral edge of the subportion to be processed that are determined from the initial segmentation and all other pixels are treated as unlabeled. The object seeds and backgrounds seeds are processed together with the pixels of the subportion that are treated as unlabeled using the graph cuts algorithm to label each unlabeled pixel as either object or background. In some embodiments a user may additionally select pixels of the subportion as background or object and the user selected pixels may also be used as object or background seeds in the graph cuts algorithm.

At step S9, a check may be performed to determine whether the error in the subportion has been corrected, or whether there are any further errors in the subportion. A user may, for example, indicate whether the error has been corrected. If errors remain in the subportion then the processing of step S8 may be repeated until errors in the subportion are corrected. If it is determined at step S9 that errors in the subportion have been corrected such that the segmentation of the subportion correctly labels all pixels as either background or object, processing passes to step S10 where the initial segmentation estimate is updated with the corrected labels generated at step S8 for the subportion. It will be appreciated that labels for all other pixels of the segmentation other than for the subportion remain unchanged.

Processing returns to step S7 where it is determined whether there are any further errors in the segmentation estimate. If it is determined that there are further errors in the segmentation estimate the processing of steps S7 to S10 is repeated until all errors in the segmentation estimate are corrected and all pixels in the image are correctly labelled as either object or background. If at step S7 it is determined that no further errors remain in the segmentation, processing passes to step S11 where the updated segmentation estimate is output. The output may take any suitable form, for example display to a user, or further processing for any suitable medical application such as processing to determine whether tissue is healthy or diseased, processing to control a machine based upon the segmentation or the like.

Figure 5A:
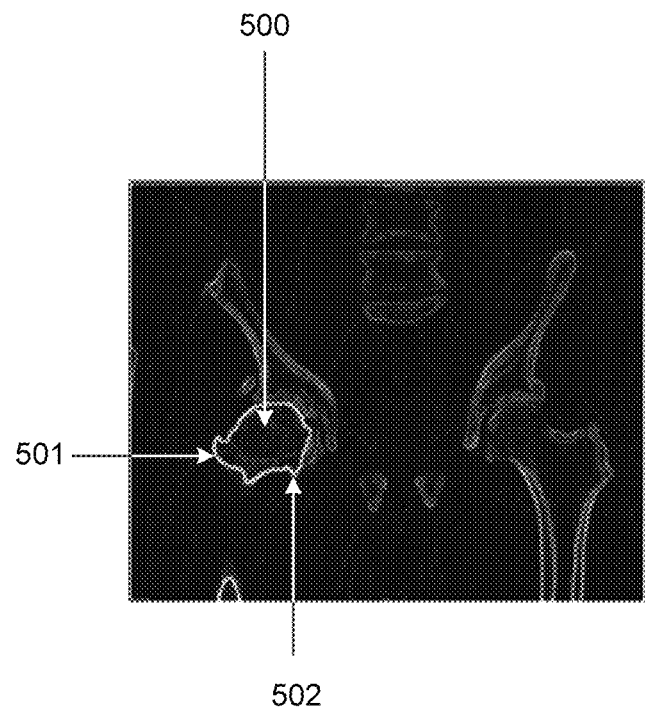
FIG. 5A illustrates a segmentation estimate of an image representing a femoral head of a proximal femur obtained using the processing of FIG. 3.
Figure 5B:
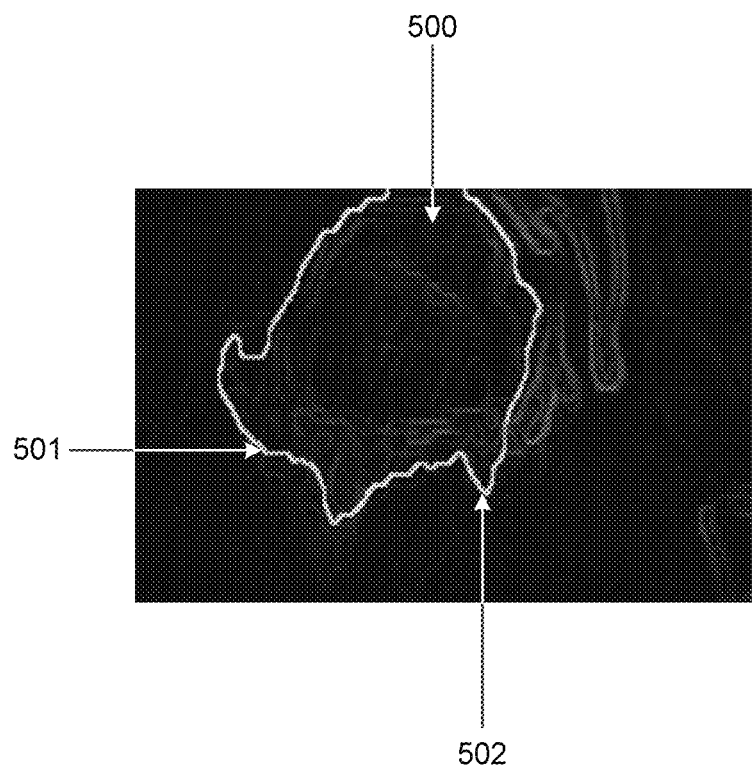
FIG. 5B is an enlarged image portion of the segmentation estimate of FIG. 5A.
Figure 6A:
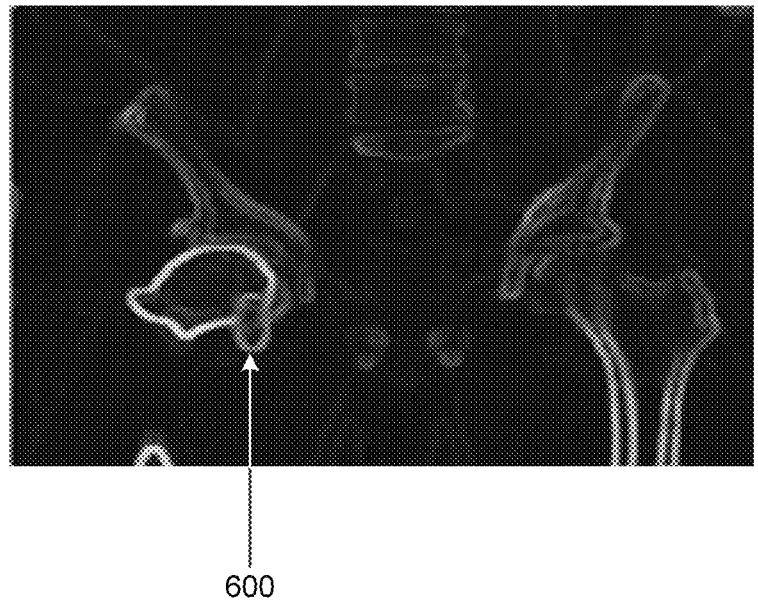
FIG. 6A illustrates a segmentation estimate of the femoral head of FIG. 5A with a user selected subportion.
Figure 6B:
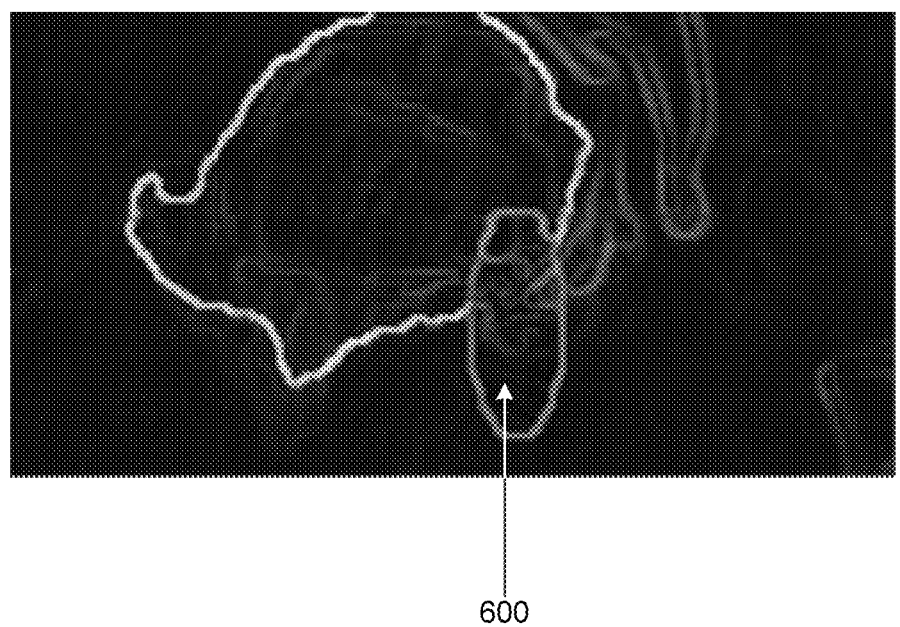
FIG. 6B is an enlarged image portion including the user marked subportion of FIG. 6A.
Figure 7A:
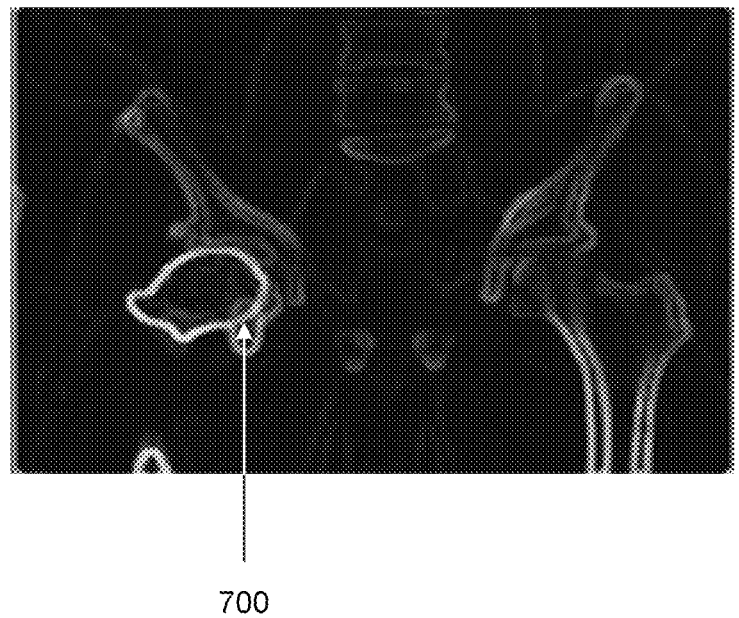
FIG. 7A represents an updated segmentation estimate of the femoral head of the proximal femur of FIG. 6B.
Figure 7B:
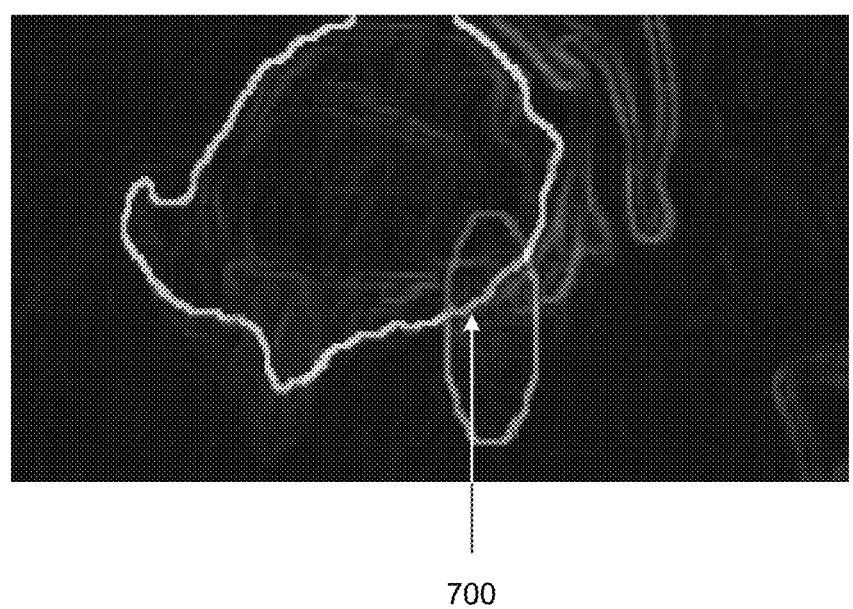
FIG. 7B represents a magnified image of the femoral head of FIG. 7A.

FIGS. 5 to 7 illustrate error correction in a segmented image using the methods described above. FIGS. 5A and 5B illustrate an initial segmentation including an error and FIGS. 6A and 6B illustrate user selection of a subportion of the initial segmentation including the error. FIGS. 7A and 7B illustrate an updated segmentation in which the subportion has been corrected using the techniques described above with reference to FIG. 3.

Referring first to FIG. 5A, an initial segmentation estimate 500 of a femoral head of a proximal femur of a subject is shown. The initial segmentation is illustrated by a highlighted outline. Areas within the highlighted outline are labelled as object portions in the initial segmentation and other areas outside the highlighted area are labelled as background portions in the initial segmentation. The femoral head in FIG. 5A is defined by a marked boundary 501. A point 502 indicates a segmentation error in which the segmentation process has incorrectly identified a background portion as object portion. FIG. 5B is a magnified image of the femoral head 500 of FIG. 5B in which the femoral head 500 and point 502 can be seen in more detail.

As described above, the segmentation estimate of FIG. 5A may be displayed to a user and the user may identify errors such as point 502 in the segmentation estimate. FIGS. 6A and 6B illustrate a user marked subportion 600.

As described above, the user marked subportion 600 is processed using a segmentation algorithm to determine an updated segmentation for the user marked subportion 600. The segmentation algorithm takes as input object seeds and background seeds. The object seeds and background seeds may correspond to pixels located at the boundary of the user marked portion, with the label for each pixel as either object or background being determined from the initial segmentation. All pixels within the user marked subportion may be marked as unknown. The segmentation algorithm processes the subportion using the labels associated with the pixels of the subportion to associate either an object label or a background label with each pixel that is labelled as unknown to generate an updated segmentation for the subportion. As described above, only pixels that are labelled as unknown are changed, and the segmentation algorithm uses only the pixels of the subportion (including the object and background seeds of the subportion).

FIGS. 7A and 7B illustrate a representation of a segmentation of the image data of FIGS. 6A and 6B respectively after performing segmentation on the user marked region 600 of FIGS. 6A and 6B. As can be seen at point 700, processing the marked region with the segmentation algorithm based on the one or more object seeds and the one or more background seeds corrects the error in the segmentation estimate and identifies the boundaries of the femoral head within the user selected subportion 600.

It will be appreciated that the image acquisition and processing system 100 in FIG. 1 is not limited to two-dimensional images and can be used to acquire and segment multi-dimensional images, for example three-dimensional images. For example, three-dimensional image data can be generated by obtaining a series of cross-sectional images of a region of interest of the subject. Pixels of the cross-sectional images can be arranged into three-dimensional image data comprising a plurality of voxels to produce a three-dimensional image. One or more object portions or one or more background portions in the three-dimensional image can be determined by the image segmentation module 104 using a segmentation algorithm that directly operates on each dimension of the three-dimensional image.

A user may select a plurality of voxels corresponding to a three-dimensional image region in a corresponding manner to that described above and the voxels may be processed using a segmentation algorithm that operates on each dimension of the three-dimensional image region. For example, the user may select an image region in one of the image slices in a three-dimensional image that permits corresponding image regions to be identified and selected in adjacent image slices. Corresponding image regions may, for example, be identified and selected in adjacent image slices using a predetermined mapping between selected voxels and corresponding voxels in adjacent image slices. For example, selection of a voxel (x, y, z) in a slice z may cause selection of corresponding voxels (x, y, z±1) and (x, y, z±2) in slices z±1, z±2 respectively, that is, selection of the same voxel in two slices either side of the slice in which the voxel is selected. The selection may additionally or alternatively cause selection of voxels other than corresponding voxel (x, y, z±a) in adjacent slices, wherein a may be any value between 0 to n+1 for n number of image slices. For example voxels (x±1, y±1, z±a) may be caused to be selected in at least one adjacent slice. In an example three-dimensional selection process, selection of a voxel in an image slice may cause selection of a volume of voxels having a generally barrel shape centered on the voxel, with the axis perpendicular to the slice plane. It will be appreciated that a method corresponding to that described above can be used to select an image region in a four-dimensional image, with a corresponding process used to select image slices in the time dimension and select voxels in the selected image slices.

It will be appreciated that the method described above is not limiting. Various modifications can be made to the described method without departing from the scope of the present invention.

The invention claimed is:

1. A method for segmenting an image, the method comprising:
   receiving one or more object seeds associated with one or more first object portions represented by a first image;
   receiving one or more background seeds associated with one or more first background portions represented by the first image;
   receiving a second image representing one or more second object portions and one or more second background portions, wherein the first image comprises a plurality of subportions and the second image is a subportion of the plurality of subportions of the first image, wherein the second image represents image regions of the plurality of image regions to be reclassified; and
   processing the second image based on the one or more object seeds and the one or more background seeds to determine the one or more second object portions and the one or more second background portions.

2. The method of claim 1, wherein the first image comprises a plurality of image regions; and
   wherein each of the image regions of the first image is identified as an object seed or a background seed.

3. The method of claim 2, wherein each of the image regions of the first image is identified as an object seed or a background seed by processing the first image using a first segmentation algorithm.

4. The method of claim 3, wherein processing the first image using a first segmentation algorithm comprises fitting a model to the image.

5. The method of claim 1, wherein the second image comprises a plurality of image regions.

6. The method of claim 5, wherein each seed of the one or more object seeds and the one or more background seeds is associated with a respective image region.

7. The method of claim 5, wherein processing the second image comprises associating image regions of the plurality of image regions with the one or more second object portions and the one or more second background portions based on the one or more object seeds and the one or more background seeds of the first image.

8. The method of claim 1, wherein processing the second image comprises processing the second image using a second segmentation algorithm.

9. The method of claim 8, wherein the second segmentation algorithm is based upon a graph cuts algorithm.

10. The method of claim 1, wherein processing the second image based on the one or more object seeds and the one or more background seeds comprises processing the second image based upon one or more object seeds and one or more background seeds associated with the peripheral edge of the second image.

11. The method of claim 1, wherein the second image is a subportion of the first image selected by a user.

12. The method of claim 11, wherein the first image is displayed to a user and wherein the second image is selected based upon the displayed image.

13. A non-transitory computer readable medium configured to cause a computer to carry out a method according claim 1.

14. A computer apparatus for segmenting an image, the apparatus comprising:
   a memory storing processor readable instructions; and
   a processor configured to read and execute instructions stored in said memory;
   wherein said processor readable instructions comprise instructions controlling said processor to carry out a method according to claim 1.

15. The method of claim 1, wherein processing the second image comprises classifying each image region of the second image as object or background.

* * * * *